United States Patent [19]
Carmichael

[11] Patent Number: 5,698,793
[45] Date of Patent: Dec. 16, 1997

[54] FLOW METERS

[75] Inventor: Richard Quentin Carmichael, Huntley, United Kingdom

[73] Assignee: Spirax-Sarco Limited, Gloucestershire, United Kingdom

[21] Appl. No.: 707,689

[22] Filed: Sep. 4, 1996

[30] Foreign Application Priority Data

Sep. 6, 1995 [GB] United Kingdom ............ 9518222

[51] Int. Cl.$^6$ .................................................. G01F 1/22
[52] U.S. Cl. ................................ 73/861.58; 73/861.53
[58] Field of Search ..................... 73/861.52, 861.54, 73/861.55, 861.56, 861.58, 861.61, 861.63, 861.64

[56] References Cited

U.S. PATENT DOCUMENTS

| | | | |
|---|---|---|---|
| 3,287,971 | 11/1966 | Bahniuk | 73/861.58 |
| 3,979,955 | 9/1976 | Schulte et al. | 73/861.55 |
| 4,459,860 | 7/1984 | Walters . | |
| 4,811,607 | 3/1989 | Walters et al. | 73/861.58 |
| 5,419,203 | 5/1995 | Carmichael | 73/861.58 |

FOREIGN PATENT DOCUMENTS

| | | |
|---|---|---|
| 0522708 | 1/1993 | European Pat. Off. . |
| 418350 | 9/1925 | Germany . |
| 720527 | 5/1942 | Germany . |
| 1190912 | 5/1970 | United Kingdom . |
| 1477530 | 6/1977 | United Kingdom . |
| 1486130 | 9/1977 | United Kingdom . |
| 1566251 | 4/1980 | United Kingdom . |
| 2123964 | 8/1984 | United Kingdom . |
| 2161939 | 1/1986 | United Kingdom . |

*Primary Examiner*—Ronald L. Biegel
*Attorney, Agent, or Firm*—McDermott, Will & Emery

[57] ABSTRACT

A flow meter comprises a divergent nozzle region 6 and a plug 10 which is axially displaceable within the nozzle region 6 under the influence of a flowing fluid. The plug 10 is guided, during displacement, by vanes 38 extending inwardly from the wall of the nozzle region 6. The plug 10 is displaceable against the action of a spring 20 which abuts a support ring 22. The force applied by the spring 20 to the support ring 22 is transmitted to a strain element 26. Processing circuitry 36 receives inputs from strain gauges 32 and provides an output representing the flow rate of fluid through the flow meter.

13 Claims, 3 Drawing Sheets

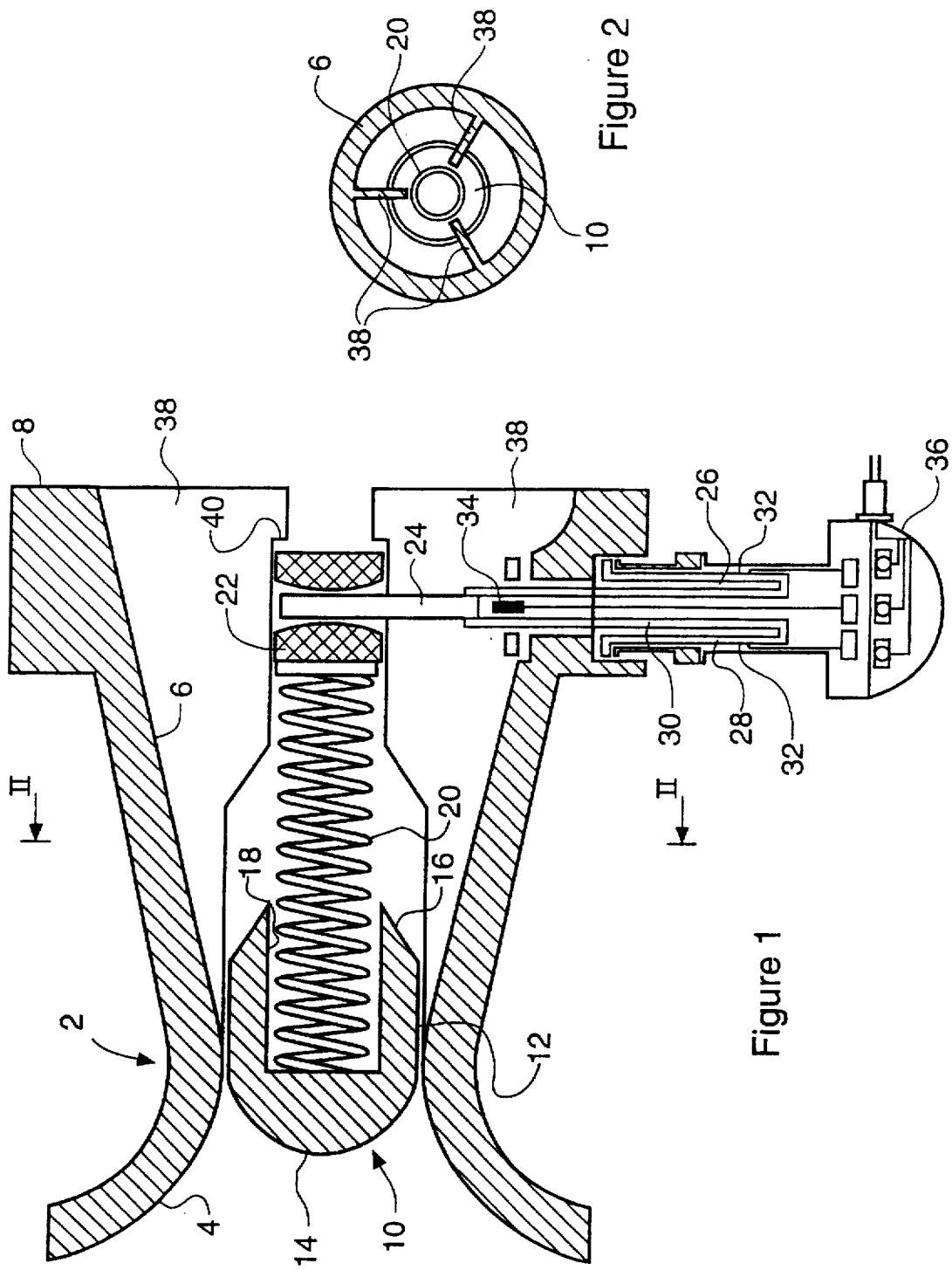

5,698,793

1

FLOW METERS

BACKGROUND OF THE INVENTION AND PRIOR ART

This invention relates to flow meters.

Variable area flow meters are known, for example, from EP-A-0522708, which discloses a flow meter comprising an orifice within which a conical plug is situated. Displacement of the conical plug against the action of a spring, under the influence of the flowing fluid, varies the flow cross-section between the plug and the edge of the orifice. The pressure difference across the plug provides an output representing the flow rate through the flow meter. Because the position of the conical plug within the orifice varies in dependence on the flow rate, the flow meter can provide accurate flow rate measurements over a wide range of flow rates.

The conical plug of EP-A-0522708 is supported within the orifice on a shaft which is itself supported on a spider carried within a duct which provides the orifice. The accumulation of tolerances which occurs with this construction makes it difficult to achieve concentricity between the plug and the orifice. Since, in a variable area flow meter, the plug should never entirely close the orifice, the lack of concentricity means that the clearance between the plug and the orifice will, in practice, be relatively large. This means that the flow meter is not able to measure low flow rates with accuracy.

Also, the friction between the plug and the shaft leads to hysteresis in the operation of the flow meter and, in some cases, the plug can jam entirely on the shaft.

SUMMARY OF THE INVENTION

According to the present invention there is provided a flow meter comprising a nozzle having a region which is divergent in the intended direction of flow through the flow meter, and a plug situated within the divergent region of the nozzle and guided for displacement along the nozzle by vanes which extend inwardly of the nozzle, such displacement, by a pressure difference generated by the flowing fluid, varying the flow cross-section between the outer surface of the plug and the inner surface of the nozzle, measuring means being provided which is responsive to the pressure difference across the plug in the direction of flowing fluid, thereby to provide an output representing the flow rate of the fluid through the flow meter.

Preferably, the nozzle is in the form of a venturi, of which the divergent region may be conical. The nozzle may be provided with a flange for the purpose of mounting the flow meter within a pipeline between two pipe flanges.

The measuring means may comprise a differential pressure cell for direct measurement of the pressure difference across the plug. However, the measuring means may alternatively be responsive to the displacement of the plug, or to the force applied, through a resilient biasing means, to a supporting element. The supporting element may comprise a carbon ring or a metallic ring having a low friction surface coating, and may be mounted within the nozzle by means of a strain element provided with strain gauges for providing an output representing the flow rate of fluid within the flow meter. The strain element may comprise an outer tube which is supported at one end on the nozzle, and is connected at the other end to one end of an inner tube which extends through the outer tube and carries the support at its other end.

The measuring means may have a temperature sensor to provide temperature compensation.

The plug may be generally cylindrical, having a hemispherical leading end (with respect to the flow direction through the meter). The trailing end of the plug may be profiled in order to reduce turbulence in the flow passing between the plug and the nozzle. In an alternative embodiment, the plug may be spherical, and may be hollow.

In a preferred embodiment, the plug is biased in the direction against the intended direction of flow through the meter by means of a spring. The plug may have a recess for receiving an end of the spring. Means may be provided for guiding the spring so as to prevent buckling. This guiding means may be in the form of a guide rod which is secured either to a plug or to a stop at the other end of the spring, and which extends within the spring. Alternatively, or in addition, the guide means may comprise a telescopic spring enclosure.

BRIEF DESCRIPTION OF THE DRAWINGS

FIG. 1 is a sectional view of a flow meter;

FIG. 2 is a cross-section, on a reduced scale, taken on the line II—II in FIG. 1;

DETAILED DESCRIPTION OF PREFERRED EMBODIMENTS

Figure 3:
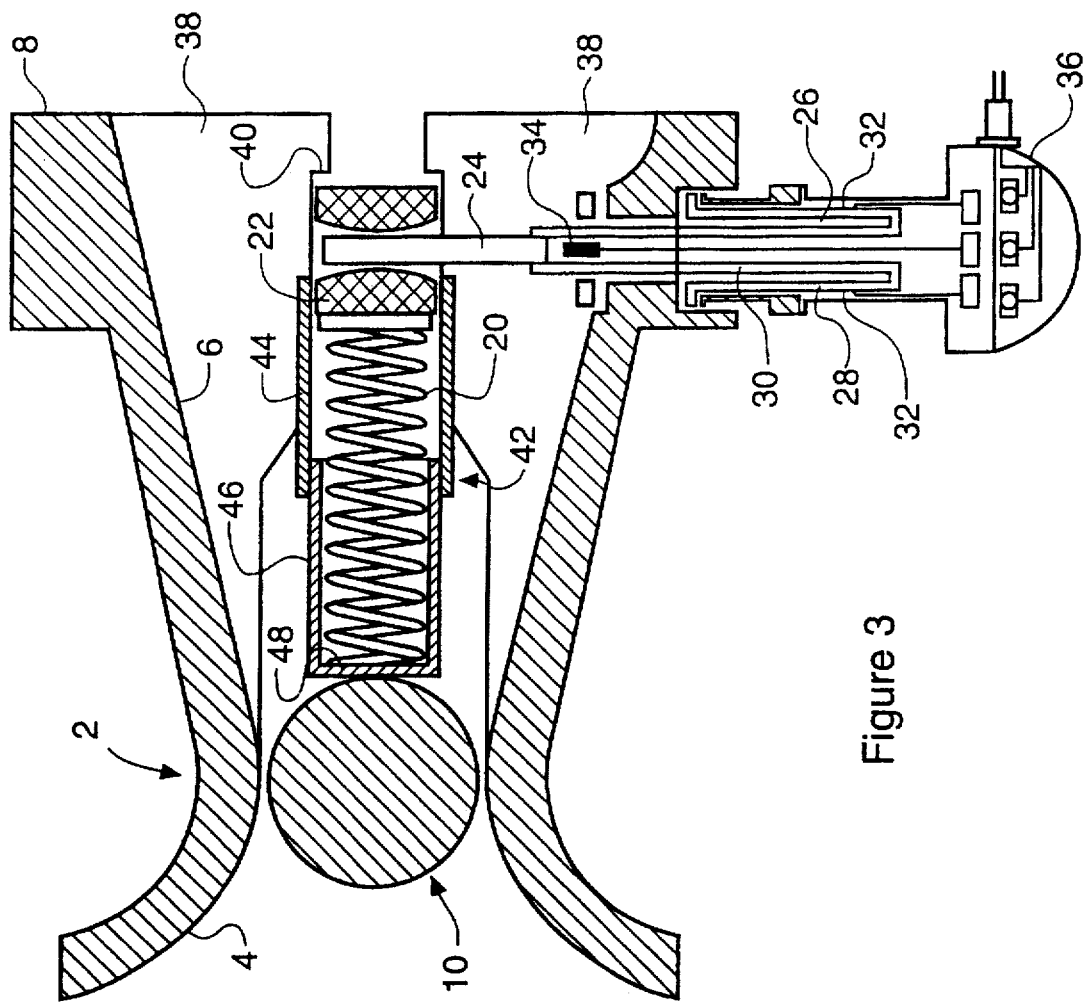
FIG. 3 corresponds to FIG. 1 but shows an alternative form of the flow meter.

The flow meter shown in FIG. 1 comprises a nozzle 2 in the form of a venturi having a convergent region 4 and a conical divergent region 6. The divergent region 6 has a flange 8 for supporting the flow meter between pipe flanges in a pipeline. A plug 10 is situated within the nozzle 2. The plug 10 has a cylindrical central region 12 with a hemispherical leading end 14 and a tapering trailing end 16. The plug 12 has a cylindrical recess 18 which receives one end of a spring 20. The other end of the spring 20 abuts against a support 22 in the form of a carbon ring.

Means (not shown) is provided for limiting displacement of the plug 10 to the left, as seen in FIG. 1.

The carbon ring 22 receives one end of a support element 24 which is mounted on a strain element 26. The strain element 26 comprises an outer tube 28 which is secured at one end to the flange 8 of the nozzle 2. At its other end, the outer tube 28 is joined to one end of an inner tube 30, the other end of which carries the support element 24. Strain gauges 32 are attached to the outer tube 28. A platinum resistance thermometer 34 is provided within the inner tube 30 at a position which extends into the nozzle 2. The strain gauges 32 and the thermometer 34 are connected by leads to processing circuitry 36.

The divergent region 6 of the nozzle 2 has inwardly projecting vanes 38. Three such vanes 38 are shown in FIG. 2, but more than three vanes may be provided. At the leading region 6 of the nozzle 2, the vanes terminate on a diameter slightly greater than the outer diameter of the cylindrical portion 12 of the plug 10. In the region of the support 22, the vanes terminate at an intermediate diameter, and, beyond the support 22, the vanes 38 terminate at an even smaller diameter, providing a stop 40.

In operation, the flow meter is mounted within a pipeline by means of the flange 8. Fluid, such as steam, flowing within the pipeline generates a pressure difference across the plug 14 which tends to move the plus 14 to the right, as seen in FIG. 1, against the action of the spring 20. At low flow rates, the fluid will pass between the plug and the narrowest part of the divergent region 6 but, as the flow rate increases, the plug will be pushed progressively further to the right, and the flow cross-section between the plug 10 and the nozzle 2 will increase. The tapering trailing end 16 of the plug 10 helps to prevent the flow from breaking away from the surface of the plug 10, so avoiding turbulence and irrecoverable pressure loss.

As the plug 10 is displaced, the spring 20 will be compressed, and the force applied by it, through the ring 22, to the support element 24 will increase. The resulting small deflection of the strain element 26 will cause corresponding deflections of the strain gauges 32, which provide signals to the processing circuitry 36, as will the platinum resistance thermometer 34. The resulting output from the processing circuitry 36 represents the flow rate passing through the flow meter.

Under very heavy flows, the ring 22 may be pushed against the stop 40, which services to limit deflection of the strain element 26.

It will be appreciated that the plug 10 is centered within the nozzle 2 directly by the vanes 38. Consequently, the clearance (shown exaggerated in FIG. 1) between the plug 10 and the narrowest part of the nozzle 2 can be made small, because there is no possibility of a build-up of tolerances as in the flow meter disclosed in EP-A-0522708. By reducing the minimum clearance between the plug 10 and the nozzle 2, the responsiveness of the flow meter to very low flow rates is improved, increasing the range over which the flow meter will operate. Also, frictional effects and the risk of jamming are minimized.

Furthermore, by eliminating the need to mount the plug on a shaft supported within the pipeline, the manufacturing cost and complexity is reduced.

FIG. 3 shows a flow meter which is generally similar to that of FIG. 1, particularly with regard to the measuring means for converting the force applied by the spring 20 to the carbon ring 22 into output signals from the processing circuitry 36. In FIG. 2, the same reference numbers are used for similar parts as in FIG. 1.

In the embodiment of FIG. 3, the plug 10 is a spherical ball, which may be hollow in order to reduce its mass and consequently the response of the flow meter to fluctuations in flow rate. The spring 20 is enclosed, over its full length, by a telescope enclosure 42 which comprises an outer tube 44 secured within cut-outs in the vanes 38. An inner tube 46 slides within the outer tube 44 and has a closed end 48 which abuts the ball 10. The enclosure 42 thus serves to prevent lateral deflections of the spring 20, and also serves to avoid turbulence in the flow downstream of the ball 10.

Figure 4:
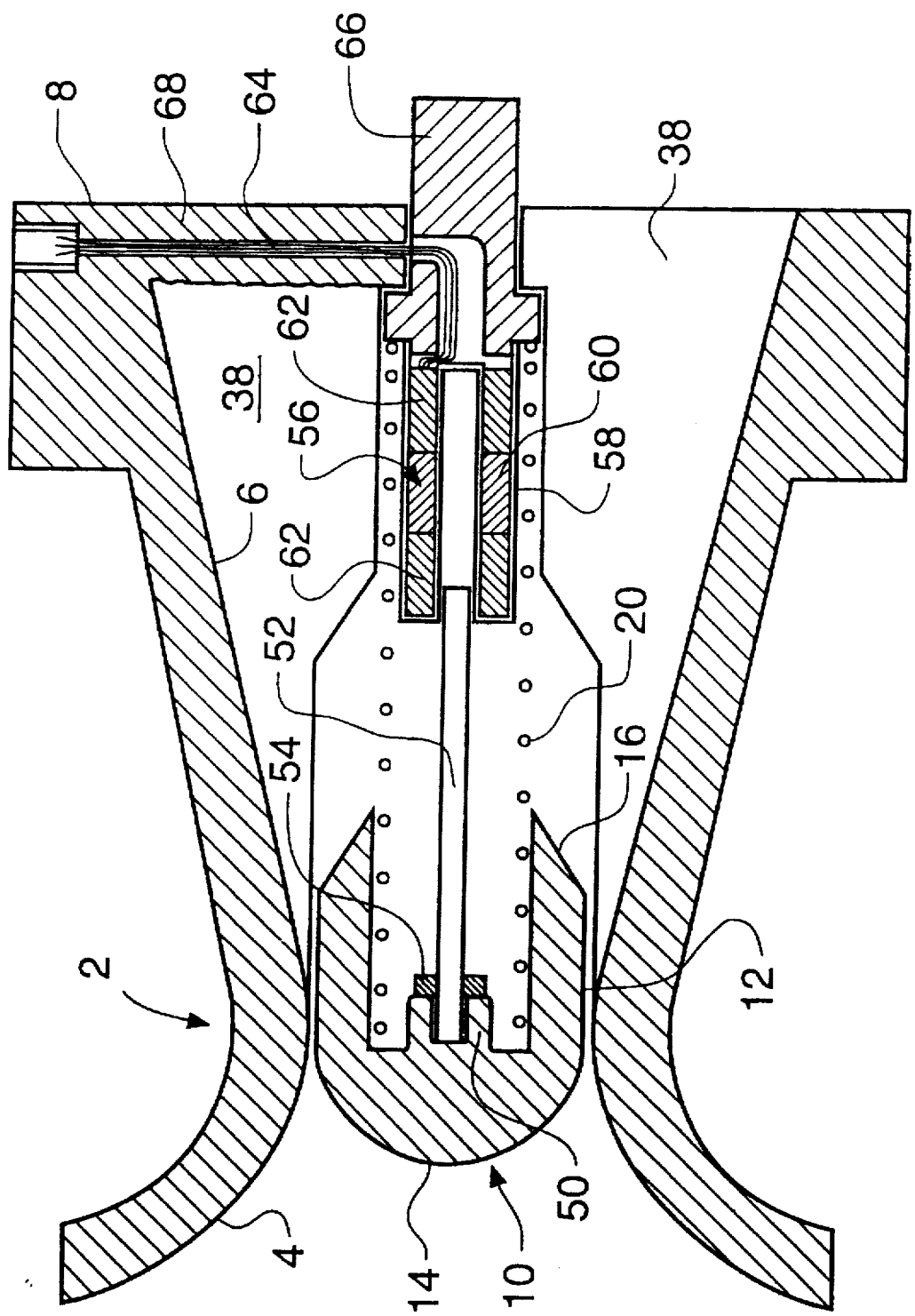
FIG. 4 corresponds to FIG. 1 and shows a third embodiment of a flow meter.

FIG. 4 shows a third embodiment of a flow meter. This embodiment is similar to that of FIG. 1, but provides a different form of measurement means. Again, the reference numbers used in FIG. 4 are the same as those used in FIG. 1 for similar components.

In the embodiment of FIG. 4, the plug 10 has the same external form as that of FIG. 1, but, at the closed end of the recess 18, there is a tapped boss 50 which receives a screw-threaded end of a rod 52 made from a magnetic material. The rod 52 is secured by a nut 54.

At its end away from the plug 10, the rod 52 extends into a coil assembly 56 enclosed in a nonmagnetic casing 58. The coil assembly 56 comprises a primary coil 60 and two secondary coils 62. The coils are connected to operating and processing circuitry (not shown) by leads 64 which extend through a stop member 66 and a thickened region 68 of one of the vanes 38. The stop 66 serves as an abutment for the end of the spring 20 away from the plug 10.

In operation, movement of the plug 10 causes movement of the rod 52 within the coil assembly 56. The flux linking between the primary coil 60 and the secondary coil 62 is varied in accordance with the position of the rod 52, and consequently the current induced in the secondary coils 62 and detected by the processing circuitry serves as an indication of the position of the plug 10 and consequently of the flow rate through the meter.

In all embodiments, the plug 10 may be coated with a low friction or wear-resistant coating.

I claim:

1. A flow meter comprising:

a nozzle having a region which is divergent in the intended direction of flow through the flow meter, vanes which extend inwardly of the nozzle, each vane terminating at a respective radially inner free edge which extends along said region of the nozzle, a plug situated within the divergent region of the nozzle, wherein the plug having an outer surface which cooperates with the radially inner free edges of the vanes to guide the plug for displacement along said region of the nozzle, such displacement, by a pressure difference generated by the flowing fluid, varying the flow cross-section between the outer surface of the plug and the inner surface of the nozzle, and measuring means which is responsive to the pressure difference across the plug in the direction of flowing fluid, thereby to provide an output representing the flow rate of the fluid through the flow meter.

2. A flow meter as claimed in claim 1, in which the nozzle is in the form of a venturi.

3. A flow meter as claimed in claim 1, in which the divergent region of the nozzle is conical.

4. A flow meter as claimed in claim 1, in which the nozzle has a flange adapted for mounting the flow meter in a pipeline between pipe flanges.

5. A flow meter as claimed in claim 1, in which the measuring means is responsive to displacement of the plug along the nozzle.

6. A flow meter as claimed in claim 1, in which resilient means is provided which biases the plug in a direction opposite to the intended direction of flow through the flow meter, the resilient means acting between the plug and a support mounted within the nozzle.

7. A flow meter as claimed in claim 6, in which the measuring means is responsive to the force applied by the resilient means to the support.

8. A flow meter as claimed in claim 7, in which the support acts on a strain element, the measuring means comprising strain gauges provided on the strain element so as to be responsive to deflection of the strain element under the force applied by the resilient means.

9. A flow meter as claimed in claim 8, in which the strain element comprises a first elongate portion which is mounted at one end on the nozzle and is connected at its other end to one end of a second portion, the other end of which engages the support.

10. A flow meter as claimed in claim 6, in which the plug has a recess which receives an end of the resilient means.

11. A flow meter as claimed in claim 6, in which the resilient means comprises a spring, guide means being provided for resisting lateral deflection of the spring.

12. A flow meter as claimed in claim 11, in which the guide means comprises a telescopic spring enclosure.

13. A flow meter as claimed in any one of the preceding claims, in which the measuring means includes means for compensating for changes in temperature of the flowing fluid.

* * * * *